United States Patent Office 2,895,913
Patented July 21, 1959

2,895,913

MAGNESIUM CONTAINING ORGANIC COMPOSITIONS AND METHOD OF PREPARING THE SAME

Robert L. Carlyle, Lake Jackson, Tex., and Earl F. Morris, Ponca City, Okla., assignors to Continental Oil Company, Ponca City, Okla., a corporation of Delaware No Drawing. Application May 28, 1957
Serial No. 662,002

10 Claims. (Cl. 252—18)

This invention relates to stable oil dispersible basic magnesium containing organic compositions and methods of making the same. Such compositions possessing increased detergency and increased reserve basicity find especial utility as additives in lubricating oils and likewise are useful for producing corrosion inhibiting compositions and similar purposes.

It is believed that in heavy duty detergent type lubricating oil compositions for use in diesel and like internal combustion engines, at least two requirements must be met by such oils (in addition to lubricity, stability, and the like) if a high degree of engine cleanliness is to be maintained. First, the oil must possess the power to disperse insolubles formed by fuel combustion or oil oxidation, or both; and second, the oil must be capable of neutralizing acidic lacquer precursors formed by either oil oxidation or interaction of the oil with sulfur acids produced from fuel combustion, or both of these conditions. The detergents generally employed in oils for engine operation with high sulfur fuel (e.g., conventional metal sulfonates) are only mildly alkaline and their basicity is rapidly depleted during engine operation.

It is accordingly a principal object of this invention to provide metal containing, stable dispersions of inorganic compounds in mineral oil and process for the production of such dispersions.

It is another object of our invention to provide highly useful mineral oil compositions utilizing such dispersions.

Other objects of our invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a process for producing a stable dispersion of a basic magnesium containing compound in lubricating oil compositions which comprises:

(a) Reacting magnesium with an excess of an alkanol containing less than 6 carbon atoms forming an alkanol insoluble magnesium alkoxide.

(b) Forming an alkanol soluble magnesium alkoxide-carbon dioxide complex by passing carbon dioxide through the magnesium alkoxide-alkanol mixture until the same is acid to alpha-naphthol benzein indicator.

(c) Adding said complex to a lubricating oil containing an oil soluble dispersing agent in an amount that is sufficient to give a magnesium content of the resulting mixture that is greater than that produced by the presence of chemically combined magnesium in the oil soluble dispersing agent alone whereby a homogeneous system is formed, and (d) Condensing from said homogeneous system an oil insoluble magnesium compound in particles the diameter of which are less than .25 micron by heating said system whereby said alkanol is removed and said complex is decomposed Alternately and somewhat less preferably, steps (b) and (c) above may be interchanged, that is, the reaction mixture of magnesium and alkanol may be dispersed in a lubricating oil containing a dispersing agent; and the dispersion may then be treated with carbon dioxide.

While we do not wish to be found by any particular theory as to the structure of this complex, we believe that the alcohol soluble complex formed by passing carbon dioxide through a mixture of magnesium alkoxide in alkanol has the following structure:

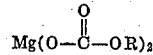

wherein R is a lower alkyl group.

In support of this theory, the following is submitted:

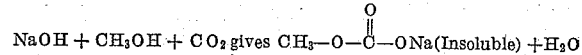

Carbon dioxide, sodium, and oxygen analyses of the product formed by the above identified reaction indicated that it had the formula $NaC_2H_3O_3$. E. Szarvasy, Ber., 30, 1836 (1897), prepared and identified

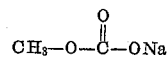

as the reaction product of $CH_3$—O—$Na+CO_2$. Infrared spectra analyses of the product prepared in accordance to the method of E. Szarvasy and that prepared by the reaction of sodium hydroxide, methyl alcohol, and carbon dioxide show they are identical. J. Dumas and E. Peligot, Ann., 1840, 35, 283, reported that a compound having the structure

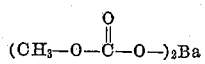

was formed by reacting barium oxide, methyl alcohol and carbon dioxide. Our analysis indicate that the product formed by reacting these three components is as follows:

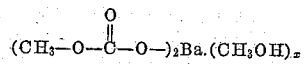

On heating the complex prepared in accordance to our invention in the presence of moisture, the reaction proceeds as follows:

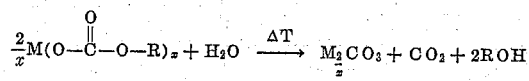

Before proceeding with specific examples illustrating our invention, it may be well to indicate in general the nature of the materials required in the process.

MAGNESIUM

The magnesium used in the process may be in the form of bars, rods, turnings, or powder.

ALCOHOLS

The alcohols which may be used in the process of my invention include any alcohol that reacts readily with magnesium and is volatile. This includes saturated aliphatic alcohols containing from one to five carbon atoms. Since methanol and ethanol react very readily with magnesium and are readily available, they are the preferred alcohols for the reaction. Isopropanol is satisfactory; however, its reaction with magnesium is difficult to initiate and very slow. The primary alcohols through normal hexyl alcohol are quite satisfactory in their reaction with magnesium, and they are volatile. Although the secondary and tertiary alcohols may be used through hexyl alcohols, their reactions with magnesium are very slow. Powdered magnesium, magnesium having clean surfaces, and reaction initiators such as mercuric chloride and carbon tetrachloride are useful in carrying out the reaction with the higher alcohols. The reaction rate of magnesium with methanol is dependent upon surface area and upon the amount of mechanical distortion experienced by magnesium crystals. Ingot magnesium reacts very slowly in comparison with rods, while the reaction with magnesium turnings or powder is very rapid, approaching the explosive stage.

OLEAGINOUS CARRIERS

Oleaginous carriers which may be used include mineral lubricating oil obtained by any of the conventional refining procedures, vegetable oils such as corn oil, cottonseed oil, castor oil, etc., animal oils such as lard oil, sperm oil, etc., and synthetic oils are polymers of propylene, polyoxyalkylenes such as polyoxypropylene and esters of polyoxypropylene, dicarboxylic acid esters such as esters of adipic and azelaic acids with alcohols such as butyl, 2-ethyl hexyl and dodecyl alcohols, and esters of acids of phosphorus such as diethyl ester of decanephosphonic acid and tricresyl phosphate. If desired, the oleaginous carriers may be diluted with a solvent to reduce the viscosity. Suitable solvents include petroleum naphtha or hydrocarbons such as hexane, heptane, octane, benzene, toluene, or xylene.

DISPERSING AGENTS

A variety of oil-soluble dispersing agents may be used. Suitable dispersing agents including both anionic and nonionic forms. The sulfonates, organic phosphorus compounds, phosphorus sulfide treated olefins, and metal soaps of carboxylic acids are typical ionic dispersing agents.

SULFONATES

Sulfonates which are suitable are oil-soluble and include alkyl sulfonates, alkaryl sulfonates, the so-called mahogany or petroleum soaps, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include non-aromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totalling only about 18 carbon atoms. To attain the requisite oil solubility, therefore, requires that the hydrocarbon portion of the sulfonate have a molecular weight between about 350 and 1,000. Preferably this molecular weight is between 400 and 700. Particularly useful sulfonates include diwaxbenzene sulfonates, diwaxtoluene sulfonates, and polydodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24. As the melting point of the wax decreases the carbon content of the mixture will average as low as 18 or a little lower.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dicetyl thianthrene sulfonates, dilauryl beta-naphthol sulfonates, dicapryl nitronaphthalene sulfonates, unsaturated paraffin wax sulfonates, hydroxy substituted paraffin wax sulfonates, tetra-amylene sulfonates, mono- and poly-chlorosubstituted paraffin wax sulfonates, nitrosoparaffin wax sulfonates; cycloaliphatic sulfonates such as lauryl-cyclo-hexyl sulfonates, mono- and polywax substituted cyclo-hexyl sulfonates, and the like. The expression "petroleum sulfonate" is intended to cover all sulfonates derived from petroleum product.

Instead of using the foregoing sulfonates as such in the invention, we may also form those sulfonates in situ by adding the corresponding sulfonic acid to the mixture which then can be converted to the sulfonate by any convenient means. Generally, for convenience, such a modification is preferred. When this modified procedure is followed, we add from about 1½ to 6 times the quantity of the oil-insoluble inorganic compound than will react with sulfonic acid thus insuring the presence of an inorganic compound in the product as a dispersoid.

PHENOLIC COMPOUNDS

The phenolic organic compounds which may be used are the free oil-soluble phenolic compounds or the metal phenates thereof. Oil-solubility is imparted to such phenolic compounds by the presence in the molecule of at least nine aliphatic carbon atoms. Specific examples are: 3,5,5-trimethyl-n-hexyl phenol, n-decyl phenols, cetyl phenols, nonyl phenols, and the like; alkaryl substituted phenols such as alkyl-phenyl phenols; polyhydroxy alkyl-aromatic compounds such as 20-carbon alkyl resorcinol, or poly-hydroxy alkyl-benzenes, such as, for example, octyl catechol, triiso-butyl pyrogallol, and the like; monohydroxy alkyl-naphthalenes such as 12-carbon alkyl alpha naphthol, and the like. Alkyl substituted phenol sulfides containing at least 5-alkyl carbon atoms such as iso amyl or nonyl phenol disulfide and the like may be used. Dinonyl phenol and nonyl phenol disulfide have been found to be preferred materials.

ORGANIC PHOSPHORUS COMPOUNDS

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, phosphonic acids, and thiophosphonic acids and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, monowax phosphorus acids, mono-octadecyl phosphorus acid, monododecyl phosphorus acid, methyl cyclohexyl phosphite, capryl phosphite, dicapryl phosphite, zinc monowaxbenzene phosphonate, zinc dodecylbenzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(iso-propyl-phenyl)monothiophosphoric acids, and the like, and the oil-soluble salts thereof.

PHOSPHORUS SULFIDE TREATED OLEFINS

The phosphorus sulfide treated olefins and their oil-soluble metal salts which are suitable for use include those customarily used in lubricating oil formulations as corrosion inhibitors and/or detergents. Specifically, they include the potassium-polyisobutylene-phosphorus sulfide products described by U.S. Patent No. 2,316,080, issued on April 6, 1943, to Loane and Gaynor and a similar material containing no metal made by addition of a phosphorus sulfide to wax olefins as described in U.S. Patent No. 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

METAL SOAPS OF CARBOXYLIC ACIDS

Examples of specific soaps which are preferred for use because of cost and availability include metal soaps of naphthenic acids and the higher fatty acids.

Suitable naphthenic acid radicals include substituted cyclopentane mono- and di-carboxylic acids and cyclohexane mono- and di-carboxylic acids having at least about 15 carbon atoms for oil solubility, for example, cetyl cyclohexane carboxylic acids, dioctyl cyclopentane carboxylic acids; and dilauryl deca-hydro-naphthalene carboxylic acids, and the like, and oil-soluble salts thereof.

Suitable oil-soluble fatty acid radicals include those in which there are present at least about 8 carbon atoms. The metal salts of the unsaturated and branched chain acids being oil-soluble with fewer aliphatic carbon atoms than the saturated acids. Specific examples are: 2-ethyl hexoic acid, linoleic acid, and the like. Naturally occurring mixtures of predominantly unsaturated fatty acids such as tall oils are particularly suitable. Substituted fatty acids which are useful may include chlorostearic acids, ricinoleic acids, and the like.

Similarly as in the case of the sulfonates, we may, instead of using the foregoing carboxylic acid soap as such in the invention form those soaps in situ by adding the corresponding carboxylic acid to the mixture which then can be converted to the soap by any convenient means. When this latter procedure is followed, we add from about 1½ to 6 times the quantity of the oil-insoluble inorganic compound than will react with the carboxylic acid thus insuring the presence of an inorganic compound in the product as a dispersoid.

NONIONIC OIL-SOLUBLE SURFACE ACTIVE AGENTS

Suitable nonionic oil-soluble surface active agents for use in the process of my invention include: polyethylene glycol oleate, obtainable from General Aniline and Film Corporation under the trade name "Antarox B–100"; polyoxyethylene lauryl alcohol, obtainable from Atlas Powder Company under the trade name "Brij–30"; a condensation product of a polyglycol, fatty acid, and sodium sulfosuccinate acid obtainable from the Planetary Chemical Company under the trade name "D-Spers-O, W. PS, MO, CL"; a lanolin derivative obtainable from the Atlas Powder Company under the trade name "G–1493"; a long chain fatty ester containing multiple ether linkages obtainable from Synthetic Chemicals, Incorporated, under the trade name "Mulsor"; a fatty amino compound obtainable from the Nopco Chemical Company under the trade name "Nopco 1219–A"; an alkylated aryl polyether alcohol obtainable from the Rohn and Haas Company under the trade name "Triton X–45"; and a dimeric alkylated aryl polyether alcohol obtainable from the Rohn and Haas Company under the trade name "Triton X–155."

CATIONIC OIL-SOLUBLE SURFACE ACTIVE AGENTS

Suitable cationic oil-soluble surface active agents for use in the process of my invention include: a substituted oxazoline, obtainable from Commercial Solvents Corporation under the trade name "Alkatergl C, O, OX"; heterocyclic tertiary amine

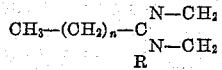

obtainable from Alrose Chemical Company under the trade name "Alro amines, C, O, S"; a secondary fatty acid amine, obtainable from Armour and Company under the trade name "Armeen 2 C, 2 HT"; quaternary ammonium compounds of the formula

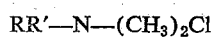

obtainable from Armour and Company under the trade name "Arquad 2 C, 2 HT"; and a modified cationic agent, obtainable from Alrose Chemical Company under the trade name "Detergent I–160."

As pointed out above the reaction rate between magnesium and alcohol is dependent upon the physical condition of the magnesium used. As is true for chemical reactions in general the reaction rate increases with temperature. The effect of these variables is apparent from the results reported in the table below.

*Reaction rates for reaction of magnesium with methanol*

| Physical Condition of Magnesium | Temperature, °C. | Reaction Rate, Grams Mg/hr./cm.² |
| --- | --- | --- |
| Ingot | 36 | 0.025, 0.025 |
| Ingot | 64 | 0.065, 0.075 |
| Extruded rod (1.3″ dia.) | 36 | 0.126 |
| Extruded rod (1.3″ dia.) | 64 | 0.16 |

Water is an inhibitor to the reaction. Clean magnesium will not react with methanol containing 4.5 percent water.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

EXAMPLE 1

A vessel equipped with a reflux condenser and a fritted glass tube for entry of gas was charged with 180 parts of anhydrous methanol and 10 parts of magnesium turnings. The reaction proceeded at reflux temperature, and after a period of 8 hours, evolution of hydrogen had ceased and the mixture consisted of a suspension of finely divided insoluble material in alcohol. Into this suspension was passed carbon dioxide until the mixture was acid to alpha naphthol benzein. At this point 35.2 parts of carbon dioxide had been absorbed. The resulting clear methanol solution analyzed 4.5 percent magnesium.

EXAMPLE 2

A vessel equipped with an agitator and a condenser set for distillation was charged with 100 parts of an alkyl benzene sulfonic acid solution (analyzing 26.8 percent sulfonic acid of molecular weight of 445, and 73.2 percent naphtha), 50 parts of 170 pale oil, and 75 parts of water. There was then added dropwise 200 parts of magnesium complex prepared as in Example 1. The resulting dispersion was subjected to distillation to a pot temperature of 150° C. The resulting product was bright and oil soluble and analyzed 8.3 percent magnesium.

EXAMPLE 3

Example 2 was repeated with the exception that 400 parts of sulfonic acid solution (analysis: 24.6 percent alkyl benzene sulfonic acid, 24.6 percent pale oil, and 50.8 percent naphtha) and 125 parts of magnesium complex solution prepared as in Example 1 was used. The resulting product was clear and bright, oil soluble, and contained 3.0 percent magnesium.

Large scale batches of magnesium complex may be conveniently prepared from extruded sticks of magnesium since when this form of magnesium is used neither heating or cooling of the reaction mixture need be applied to obtain satisfactory reaction. Complex solutions containing as much as 8 percent magnesium may be prepared, however, concentrations above 7 percent probably should be avoided because colorless acicular crystals may separate from the super-saturated solution. Concentrations up to 6 percent magnesium appear to be stable indefinitely.

The magnesium content of a magnesium complex may be related to refractive index and to density in accordance with the following:

| Percent Magnesium | Refractive Index ($n_D^{25°\,C.}$) | Density, g./cc. at 25° C. |
|---|---|---|
| 0 | 1.3276 | 0.786 |
| 1.38 | 1.3380 | 0.832 |
| 2.72 | 1.3473 | 0.878 |
| 4.89 | 1.3632 | 0.946 |
| 5.43 | 1.3669 | 0.967 |

EXAMPLE 4

Into a reactor was charged 1300 parts of a naphtha solution of an alkyl benzene sulfonic acid analyzing 26.8 percent sulfonic acid having a molecular weight of 512 and 73.2 percent naphtha. There was then added 540 parts of 170 pale oil and 1000 parts of water. The mixture was heated to 50° C. and 1890 parts of a magnesium complex analyzing 4.78 percent magnesium was added with agitation during 20 minutes. The mixture was allowed to stand quiescent for 20 minutes and the upper aqueous phase removed. The lower phase was subjected to distillation, heating to 150° C. to remove solvents. Carbon dioxide was blown into the mixture to further remove water and solvents. There was obtained 1,065 parts of clear viscous fluid analyzing:

| | |
|---|---|
| Magnesium _____percent__ | 8.19 |
| Magnesium sulfonate _____do____ | 27.0 |
| Carbon dioxide _____do____ | 2.7 |
| Mineral oil _____do____ | 50.9 |
| Specific gravity _____ | 1.080 |
| Viscosity at 210° F. _____cs__ | 67 |

The following experiment demonstrates the effect of using various amounts of water in the preparation of stable dispersions of basic magnesium compounds.

EXAMPLE 5

A series of preparations were made in which a reactor was charged with 100 parts of a naphtha solution of an alkyl benzene sulfonic acid analyzing 26.8 percent sulfonic acid having a molecular weight of 512 and 73.2 percent naphtha. There was then added 50 parts of 170 pale oil. The mixture was heated to 64° C., and water and magnesium complex analyzing 4.8 percent added in the amounts shown in the following table. The quality of the product for the various amounts of water and complex is as follows:

| Water Parts | Magnesium Complex, Parts | Product |
|---|---|---|
| 0 | 100 | Solid gel. |
| 15 | 100 | Partial gel. |
| 30 | 100 | Fluid, 4.8 percent Mg. |
| 45 | 100 | Fluid, 4.6 percent Mg. |
| 45 | 200 | Extremely viscous. |
| 60 | 200 | Very viscous. |
| 75 | 200 | Fluid, 8.3 percent Mg. |

These data show that the amount of water used is important in the preparation of a final product wherein the magnesium content of the final product is above 4.6 percent.

EXAMPLE 6

A stable dispersion of a basic magnesium compound was prepared in a continuous manner in a reactor of 500 ml. capacity, fitted with an agitator and means for heating to 50° C. by adding thereto at a rate of 526 ml./hr. a naphtha solution of an alkyl benzene sulfonic acid solution analyzing 26.8 percent sulfonic acid and having a molecular weight of 512 and 73.2 percent naphtha, 244 ml./hr. of 170 pale oil, 410 ml./hr. of water, and 440 ml./hr. of an alcoholic solution of a magnesium. The average residence time was 18.6 minutes. The product from the reactor passed to a settler of about 500 ml. capacity maintained at 40° C. The lower or hydrocarbon phase from the separator was passed to a stripper maintained at 160° C. where volatile solvents were removed. A clear, bright product analyzing 8.97 percent magnesium was obtained having a specific gravity (60/60° F.) of 1.096, a viscosity at 100° F. of 4,390 cs. and at 210° F. of 155 cs., a pour point of 20° F. and a flash point of 375° F. Electron micrographs of this sample indicate that no particles in excess of 0.2 micron were present and that the average size was below 0.05 micron.

EXAMPLE 7

A vessel equipped with a stirrer, thermometer, and reflux condenser was charged with 1,271 parts of anhydrous methanol. While stirring, 70.6 parts of pure magnesium turnings were slowly added to the methanol. When the reaction started, the reaction vessel was cooled by means of ice water. Even with cooling by this means, the temperature rose to 65° C., at which point refluxing was evident. Once the reaction started, it proceeded rapidly; and the temperature rose quickly. The mixture was stirred for a period of 2½ hours, and at the end of this period no metallic magnesium was apparent. At the time of this period the temperature had dropped to 30° C., and the resulting mixture was milky in appearance. Carbon dioxide was then passed through the mixture at the rate of 4 parts per minute until 130 parts had been added and the mixture was acid to alpha naphthol benzein indicator. The resulting clear methanol solution analyzed 4.8 percent magnesium.

EXAMPLE 8

A reaction vessel equipped with an agitator and a condenser set for distillation was charged with 4,800 parts of naptha postdodecylbenzene sulfonic acid solution (.598 meq./g., 49.2 percent acid oil). The magnesium methanol solution prepared in accordance to Example 7 was then slowly added to the reaction vessel containing the acid solution. The portion necessary for neutralization was added slowly, since carbon dioxide was released, causing considerable foaming. After the acid solution was completely neutralized, the remainder of the methanol magnesium complex prepared in Example 7 was added rapidly, producing a one-phase system. While stirring, the reaction vessel and contents were heated to 150° C., which procedure removed the bulk of the volatile solvents. The product was then blown with nitrogen for a period of 30 minutes at 150° C. to remove last traces of solvents. The final product was bright and fluid, oil soluble, and analyzed 2.95 percent magnesium, 3.6 percent sulfur, had a viscosity S.S.U. at 210° F. of 402, and had a base number of 76.

Similar products were made up wherein the base numbers have varied from 75 to 65, in which cases the percentages of magnesium have varied from 2.73 percent to 2.67 percent.

EXAMPLE 9

Similar products may also be made using tall oil fatty acids or refined tall oils as dispersants. The commonly accepted distinction between these two dispersants is merely the concentration of fatty acid present, namely tall oil fatty acids contain in excess of 80 percent fatty acids whereas refined tall oils contain less than this quantity. One suitable refined tall oil is Crofatol P-1, manufactured by Crosby Chemical Company which has the following composition:

| | |
|---|---|
| Fatty acids _____ percent__ | 71 |
| Rosin acids _____ do____ | 0.6 |
| Unsaponifiables _____ do____ | 26 |
| Acid number _____ | 153 |
| Saponification number _____ | 154 |
| Iodine value _____ | 142 |

In a typical preparation using this material, 202.5 parts of Crofatol P–1, 50.5 parts of 170 S.S.U. at 100° F. mineral oil, 104 parts of 70° naphtha, and 140 parts of water were charged to a vessel equipped with stirrer, heater, and reflux condenser. The charge was agitated and heated to 50° C., whereupon 251 parts of magnesium complex similar to Example 1 but containing 5.2 percent magnesium was slowly added over a period of 20 minutes. The mixture was then allowed to stand quiescent until phase separation occurred, whereupon the lower hydrocarbon phase was separated and heated to 150° C. to remove volatile solvents. The product so obtained was 248 parts of a transparent reddish, oil soluble, moderately viscous fluid containing 5.26 percent magnesium and had a base number of 220.

The procedure of Example 2 was followed with the exception that a natural sulfonic acid analyzing as follows

| | Percent |
|---|---|
| Mineral oil _____ | 28 |
| Sulfonic acid _____ | 56.5 |
| Sulfuric acid _____ | 6 |
| Water _____ | 9.5 | wherein the average molecular weight of the sulfonic acid equal to 495 was substituted for the alkyl benzene sulfonic acid solution. The substitution, of course, was on a molar basis. The final product obtained was similar to the final product obtained in Example 2.

In another example a natural sulfonic acid having a total acidity of 1.21 meq./g. and a sulfonic acid of 1.11 meg./g. and an average molecular weight of 430 was substituted for the alkyl benzene sulfonic acid solution of Example 2. In this particular experiment the substitution was on a molar basis. Again, the final product obtained was similar to that obtained in Example 2.

Whereas the data in Examples 2, 4, 5, 6, and 9 show that the presence of water is necessary for the preparation of a product having a magnesium content of about 4.6 percent and higher, the data of Examples 1, 3, and 8 show that no added water is necessary for products having a magnesium content of about 4.5 percent and less.

Lubricating compositions were prepared utilizing the product prepared in accordance to Example 8. In preparing the compounded lubricating oil containing these magnesium compounds plus other additives, suitable and preferred ranges of the different components vary as follows: the product of Example 8, 1 to 20 percent, 2 to 6 percent; metal dithiophosphate, .3 to 3 percent, .75 to 2 percent, respectively; and sufficient lubricating oil to make 100 percent. If desired such additives as calcium-barium phenolate sulfide and methyl dichlorostearate may also be added. The calcium-barium phenolate sulfide serves as an oxygen inhibitor, the metal dithiophosphate serves as a metal deactivator to reduce corrosion and to minimize metal-catalyzed oxidation of the lubricating composition. The methyl dichlorostearate enhances the oiliness and film strength of the lubricant.

The oil base with which the foregoing additives are blended is refined mineral lubricating oil blended to the various S.A.E. viscosity number requirements. For example the oil blends which have been used in producing the improved lubricating compositions of this invention may be prepared from Mid-Continent solvent refined and distillation oil fractions to provide a viscosity index of about 98 and a sulfur content not exceeding about .1 percent.

The character of the base oil is such that with the added component of Example 7 the finished composition will have a base number of at least about 2 and preferably not less than about 3, thus providing an engine lubricant with an actively available alkaline reserve for neutralizing service-developed corrosively acidic oxidation products.

These lubricating compositions may also have added, as is commonly done, an antifoaming agent, a pour point depressant, a viscosity index improver, all of which have been found generally compatible in the foregoing described compositions.

An oil composition of S.A.E. 10–W viscosity prepared in accordance with this invention contained the following:

Additives:
  5 percent of the magnesium containing compound of Example 8
  1.25 parts of Zn di (alkyl phenyl) dithiophosphate
Mineral oil base:
  8.16 parts Neutral 100 Pale Oil
  91.84 parts Neutral 170 Pale Oil The foregoing lubricating composition and the base oil blend were run in a four-cylinder Cub engine (International's light tractor engine adapted to a test stand) under the following test conditions:

| | |
|---|---|
| Speed _____ r.p.m__ | 2500 |
| Load _____ H.P__ | 6.5 |
| Oil sump temperature _____ °F__ | 280 |
| Water jacket temperature _____ °F__ | 200 |
| Running time _____ hours__ | 36 |

After completion of the test the engines were disassembled and the parts inspected and assigned demerit ratings based on their condition. The lower the total demerit ratings, the better is the general engine condition and the oil performance. A rating below 10 is considered to be excellent and a rating between 10 and 15 is good. Corrosion is also measured by weighing the bearing shells before and after the runs. A loss due to corrosion of less than 0.05 gram is considered satisfactory. The results of this engine test utilizing our new additive showed a total demerit rating of 8 divided as follows: piston skirts .5, varnish 3.0, sludge 2.0, and carbon 2.0. The average one-half bearing weight loss was .0113 gram. The base oil blend used in the foregoing composition (not including our new additive) had a total demerit rating of 18.0 divided as follows: piston skirts 2.0, varnish 10.5, sludge 2.5, and carbon 3.0. The average one-half bearing weight loss was 0.1891 gram.

The foregoing lubricating composition was also tested in diesel engines using fuel containing 1 percent sulfur. The use of high sulfur fuels greatly accelerates the formation of piston ring and skirt deposits, hence shortening the running time required for detergent evaluation. The engine used for this evaluation was a Witte diesel run under the following operating conditions:

| | |
|---|---|
| Speed _____ r.p.m__ | 1800 |
| Load _____ H.P__ | 4.5–5.0 |
| Oil sump temperature _____ °F__ | 145–150 |
| Water jacket temperature _____ °F__ | 260 |
| Running time _____ hours__ | 50 |

The condition of the piston is examined upon completion of the run, and assigned a demerit rating. A Witte piston rating below 8 is considered to be excellent. Those between 8 and 15 are considered to be good to fair, and indicate satisfactory performance. A rating above 20 indicates unsatisfactory performance. In this test the engine utilizing our new additive in the previously described lubricating oil composition showed a demerit rating of 2.5.

The postdodecylbenzene sulfonate used in these examples was obtained by neutralizing postdodecylbenzene sulfonic acid which in turn is obtained by the sulfonation of postdodecylbenzene. Postdodecylbenzene consists of monoalkylbenzenes and dialkylbenzenes in the approximate ratio of 2:3. Its typical properties are as follows:

| | |
|---|---|
| Specific gravity at 38° C. | 0.8649 |
| Average molecular weight | 385 |
| Percent sulfonatable | 88 |
| A.S.T.M., D-158 Engler, °F.: | |
| I.B.P. | 647 |
| 5 | 682 |
| 50 | 715 |
| 90 | 760 |
| 95 | 775 |
| F.B.P. | 779 |
| Refractive index at 23° C. | 1.4900 |
| Viscosity at: | |
| −10° C. centipoises | 2800 |
| 20° C. do | 280 |
| 40° C. do | 78 |
| 80° C. do | 18 |
| Aniline point, °C. | 69 |
| Pour point, °F. | −25 |

The base members of the products of this invention were determined by the acetic acid titration method which utilizes glacial acetic acid as the solvent and a solution of perchloric acid in glacial acetic acid as the titrant. The method is especially adapted for determinations of this type, since equilibria are obtained rapidly. The procedures for carrying out acetic acid titrations are generally outlined in Analytical Chemistry, vol. 23, No. 2, February 1951, page 337, and vol. 24, No. 3, March 1952, page 519.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The process of preparing a stable dispersion of a basic magnesium containing compound in lubricating oil compositions which comprises: (a) reacting magnesium with an excess of an alkanol containing less than 6 carbon atoms forming an alkanol insoluble magnesium alkoxide; (b) forming an alkanol soluble magnesium alkoxide-carbon dioxide complex by passing carbon dioxide through the magnesium alkoxide-alkanol mixture until the same is acid to alpha-naphthol benzein indicator; (c) adding said complex to a lubricating oil containing an oil soluble dispersing agent in an amount that is sufficient to give a magnesium content of the resulting mixture that is 50 to 500 percent greater than that produced by the presence of chemically combined magnesium in the oil soluble dispersing agent alone a quantity of water that varies from 15 to 45 parts per 100 parts of said complex whereby a homogeneous system is formed, and (d) condensing from said homogeneous system an oil insoluble magnesium compound in particles the diameter of which are less than .25 micron by heating said system whereby said alkanol is removed and said complex is decomposed.

2. The process of preparing a stable dispersion of a basic magnesium containing compound in lubricating oil compositions which comprises: (a) reacting magnesium with an excess of an alkanol containing less than 6 carbon atoms forming an alkanol insoluble magnesium alkoxide; (b) forming an alkanol soluble magnesium alkoxide-carbon dioxide complex by passing carbon dioxide through the magnesium alkoxide-alkanol mixture until the same is acid to alpha-naphthol benzein indicator; (c) adding said complex to a lubricating oil containing an oil soluble dispersing agent in an amount that is sufficient to give a magnesium content of the resulting mixture that is 50 to 500 percent greater than that produced by the presence of chemically combined magnesium in the oil soluble dispersing agent alone a quantity of water that varies from 15 to 45 parts per 100 parts of said complex whereby a homogeneous system is formed in the presence of 30–45 parts of water per 5.0 parts of magnesium contained in said complex, and (d) condensing from said homogeneous system an oil insoluble magesium compound in particles the diameter of which are less than .25 micron by heating said system whereby said alkanol is removed and said complex is decomposed.

3. The process of claim 1 wherein the alcohol is methanol.

4. The process of claim 1 wherein the alcohol is ethanol.

5. The process of claim 1 wherein the alcohol is isopropyl alcohol.

6. The process of claim 1 wherein the dispersing agent is postdodecylbenzene sulfonate.

7. The process of claim 1 wherein the dispersing agent is an alkyl benzene sulfonic acid having a molecular weight of about 445.

8. The process of claim 1 wherein the dispersing agent is an alkyl benzene sulfonic acid having a molecular weight of about 512.

9. The process of claim 1 wherein the dispersing agent is selected from the class consisting of tall oil fatty acids and refined tall oil.

10. The process of claim 1 wherein the dispersing agent is a natural sulfonic acid.

References Cited in the file of this patent

UNITED STATES PATENTS

| | | |
|---|---|---|
| 2,346,155 | Denison | Apr. 11, 1944 |
| 2,417,428 | McLennan | Mar. 18, 1947 |
| 2,501,732 | Mertes | Mar. 28, 1950 |
| 2,585,520 | Van Ess | Feb. 12, 1952 |
| 2,623,016 | Mertes | Dec. 23, 1952 |
| 2,695,910 | Asseff | Nov. 30, 1954 |

FOREIGN PATENTS

| | | |
|---|---|---|
| 644,043 | Great Britain | Oct. 4, 1950 |